(No Model.) 7 Sheets—Sheet 1.

J. L. BOGERT.
LATHE FOR TURNING AXLES.

No. 380,785. Patented Apr. 10, 1888.

(No Model.) 7 Sheets—Sheet 2.
J. L. BOGERT.
LATHE FOR TURNING AXLES.

No. 380,785. Patented Apr. 10, 1888.

(No Model.) 7 Sheets—Sheet 3.

J. L. BOGERT.
LATHE FOR TURNING AXLES.

No. 380,785. Patented Apr. 10, 1888.

(No Model.)

J. L. BOGERT.
LATHE FOR TURNING AXLES.

No. 380,785. Patented Apr. 10, 1888.

(No Model.) 7 Sheets—Sheet 6.
J. L. BOGERT.
LATHE FOR TURNING AXLES.
No. 380,785. Patented Apr. 10, 1888.

United States Patent Office.

JOHN L. BOGERT, OF FLUSHING, NEW YORK.

LATHE FOR TURNING AXLES.

SPECIFICATION forming part of Letters Patent No. 380,785, dated April 10, 1888.

Application filed March 28, 1887. Serial No. 232,806. (No model.)

*To all whom it may concern:*

Be it known that I, JOHN L. BOGERT, of Flushing, in the county of Queens and State of New York, have invented an Improvement in Lathes, of which the following is a specification.

This lathe is especially intended for turning up and finishing the ends of axles, but may be made use of in turning and finishing other articles, especially those that are comparatively long and in which the end portions require to be turned and finished.

In my improvement I make use of two head-stocks, one of which is adjustable, so that the head-stocks can be placed at the desired distances apart to suit the length of axle. Each head-stock has a tubular spindle, through which the axle is to be passed, and upon the outer end of each spindle is a chuck to adjust and clamp the axle, so that the axle may be revolved by power applied to it close to where the turning-tools are acting, thus preventing the axle springing or vibrating as the turning progresses.

The ends of axles are usually turned off tapering, and two tools are properly made use of—one to rough the surface and the other to finish it. In my lathe these two tools are mounted upon one slide, and there is a taper attachment that first brings into action the roughing-tool, as the tool-holding slide is moving in one direction, and then it brings into action the finishing-tool, as the tool-holding slide is moving in the other direction. These tools and tool-holding slides and taper attachments are applied at the two ends of the axle that is being turned, and one attendant is able to oversee the action of the four turning-tools. Besides the taper turned upon the ends of the axle, it is necessary to finish off each point or end of the axle with the shoulder or collars and screw for the attaching-nut. To effect these objects I make use of turret-heads of peculiar construction to hold the turning, boring, or screw-cutting tools, and these are brought into action successively during the time that the finishing cut is in action upon the taper surface of the axle, and I make use at one end of the lathe of a horizontal turret-head upon a vertical axis and having radially-projecting tools, and at the other end of the lathe the turret-head stands vertically upon a horizontal axis and the tools are parallel to the axis, and, in order to allow for the insertion or removal of the axle, this vertically-revolving turret-head is recessed at one side, so as to give the space necessary for freely inserting or removing the axle.

By my improvement a wagon-axle forged in one piece is completely turned and finished at both ends while in the one machine, and two, and sometimes four, tools are in operation at the same time upon the axle without any risk of trembling or inequalities in the action of the tools, because the support for the axle and the power by which it is rotated are at the outer portions of the axle, close to where the turning operations are being performed; and I remark that the respective parts of this lathe have been invented and constructed with special reference to their joint action in turning and finishing wagon-axles; but I do not limit myself to any particular article upon which the lathe is made to operate, nor to the use of all portions of the machine simultaneously, as some parts of said machine are not always required and some parts may be used separately.

In the drawings, Fig. 6 is an elevation.

Figures 3, 11:
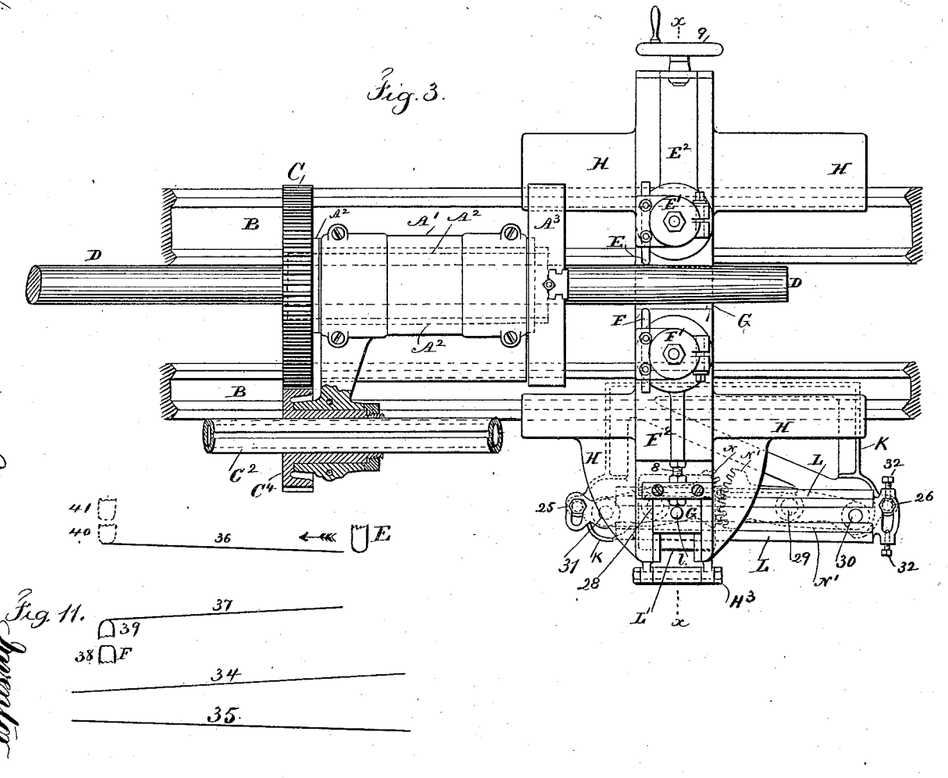
Fig. 3 is a plan view showing one of the head-stocks partially in section and one of the slides carrying the turning-tools and the automatic taper attachment.
Fig. 11 is a diagram illustrating the paths described by the turning-tool and the position of the taper-bar with respect thereto.
Figure 4:
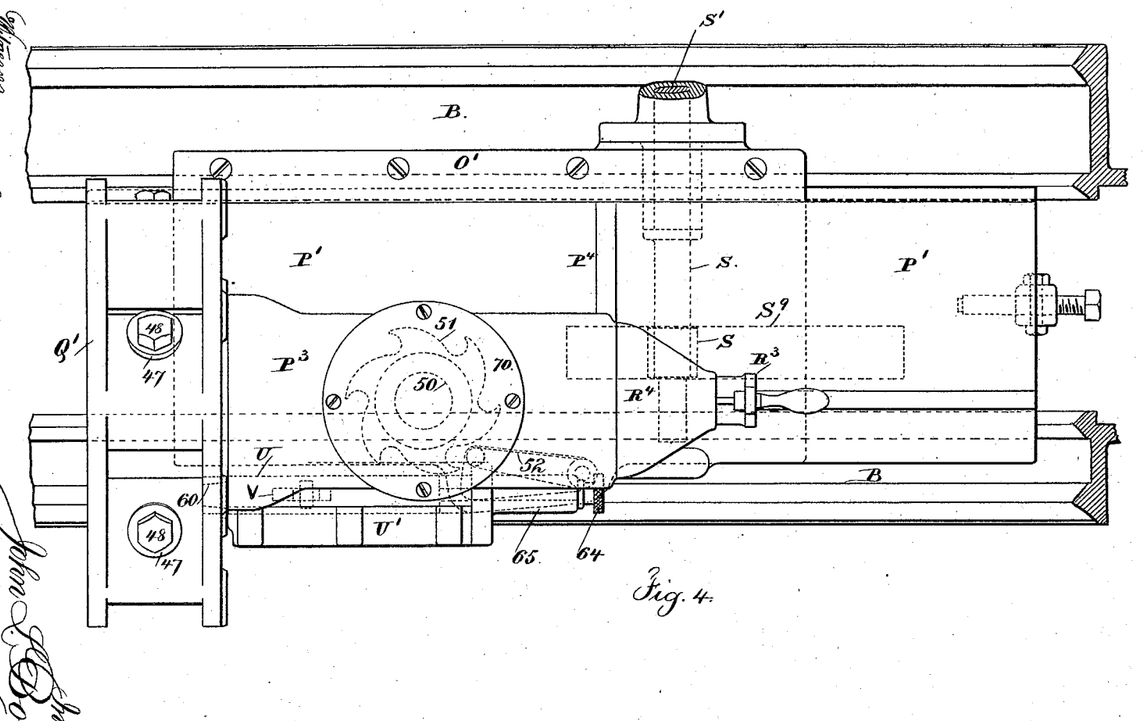
Fig. 4 is a plan, in larger size, of the vertically-revolving turret.

The head-stocks A A' rest upon and are bolted to the bed B of the machine, which bed is of suitable length and is supported upon the columns B', and upon the top edges of the bed there are V's or guides, upon which the parts rest and upon which they can be moved endwise of the lathe. The head-stock A is a fixture, and the head-stock A' can be moved along so as to accommodate different lengths of axles or other articles to be turned and finished. Each head-stock has through the same a tubular spindle, $A^2$, (see dotted lines, Fig. 3,) upon the end of which is a chuck, $A^3$, of any suitable construction adapted to grasping, adjusting, clamping, or holding centrally the axle or other article to be turned and finished, and at the back end of each tubular spindle is a driving-gear, C.

The cone-pulley C' is adapted to receive a driving-belt, and it is mounted upon the shaft $C^2$, that revolves in bearings upon the respective head-stocks A A', and there is back gearing having wheels 2, 3, 4, 5, and a back shaft, 6, by which the speed and power of the shaft $C^2$ may be varied, as usual, and there are gears $C^4$ upon the shaft $C^2$, gearing into the toothed wheels C upon the respective tubular spindles, so as to drive both tubular spindles with perfect uniformity. One of these gears $C^4$ is provided with a key or feather within a slot in the shaft $C^2$, so that such gear $C^4$ may be moved endwise upon the shaft $C^2$ when the head-stock A' is adjusted, and this gear is made with a sleeve or tubular axis surrounding the shaft $C^2$ and entering a bearing at one side of the head-stock A', so that the gear will be moved endwise of the shaft in the act of adjusting such head-stock A'.

The tools that act to turn the tapering ends of the axle D or other article that is being turned are supported by tool holders and carriages provided with taper attachments, and as these appliances are alike in every respect, I will describe only one of them, the same letters of reference being made use of upon both.

E is the roughing-tool, E' its tool post or holder, and $E^2$ the slide rest or support.

F is the finishing-tool, F' its tool post or holder, and $F^2$ the slide rest or support.

The tools E F are of any character suitable for the work to be performed, and the tool posts or holders may be of any desired construction. I, however, have shown and prefer to use tool posts or holders such as shown in my application No. 222,261, filed December 22, 1886.

G is a cross-slide, upon which the slide rests $E^2$ $F^2$ are supported, and there is a screw, 8, passing through a lug on the cross-slide G and acting upon the slide-rest $F^2$ for adjusting the same, and there are lock-nuts upon the screw for holding the parts firmly after the tool-post and tool have been adjusted, and the hand-wheel 9 and its screw 18 are provided for adjusting the slide-rest $E^2$, and there is a screw-stop, 10, in the cross-slide G, which determines the point to which the slide $E^2$ and tool E may be moved toward the work. The hand-wheel 9 and its screw are made use of for drawing back the tool E out of its way when the axle D is being inserted or removed. This cross-slide G rests upon the cross-bar of the carriage H, that slides upon the guides or V's of the upper surface of the bed B, and to this carriage the apron H' is attached and hangs down at one side of the lathe, and this apron and carriage are fed endwise of the bed B by any suitable mechanism, such as a screw. Usually, however, the shaft 12 is rotated by the gears 13, 14, and 15, and there are clutches 16 and 17, with the clutch-levers 18 and 19, to which the shifting-rods 20 and 21 are connected, and upon the shifting-rods are the collars or tappets 22, for stopping the feed at the proper points.

$H^2$ are the hand-wheels, with which the necessary gears and clutches are made use of for connecting and disconnecting the revolving feed shafts and the pinions that act against the rack-teeth 23 on the bed. These devices, being of ordinary construction, do not require further description.

At the opposite side of the bed B to the apron a dovetail slide, $B^2$, is formed, receiving the brackets K, which support the taper bars L and the devices therewith connected.

In the end of the slide G is a hole, through which a vertical pin, $l$, passes into the traveler L', that rests upon and grasps the sides of the taper-bar L. At the ends of the taper-bar L are transverse curved slots, through which pass the vertical bolts 25 and 26, that enter the bracket K, and the surface of this bracket K adjacent to the bolts 25 and 26 is flat, so that the taper-bar L rests thereupon and may be clamped by such bolts and held at any desired inclination to a vertical plane passing longitudinally through the lathe; hence as the carriage H is moved along the bed of the lathe the traveler L' upon the taper-bar and the vertical pin $l$ give to the cross-slide G and the tools carried by the same a movement transversely of the lathe and cause the tool to turn off the axle D with the desired taper.

The taper-bar L requires to be moved laterally to bring the finishing-tool F up against the axle and to move the roughing tool E out of the way, and this lateral motion has to be sufficient to prevent the roughing-tool coming in contact with the work under any circumstances. If this taper-bar were of a sufficient length to allow of the necessary conditions in moving the tools, the taper-bar might swing upon a pivot-bolt at one end and be moved by hand an equal distance first one side and then the other side of a central line or plane; but under most circumstances a long taper-bar would be inconvenient. I therefore provide for using a short taper-bar and insuring a proper motion to the same for operating upon the roughing and finishing tools. With this object in view the upper surface of the bracket K is recessed for the reception of the sector-levers N N', which are pivoted at 28 29 upon the bracket K, and the teeth of the sectors are fitted accurately and they can be turned together upon their respective pivots. The distant end of one sector-lever is longer than that of the other, and hence the bolt 30 describes a longer arc of a circle than the bolt 31, and the bolts 30 and 31 connect the taper-bar L to the sector-levers N N', and there are stop-bolts 32, passing through the end portion of the taper-bar at the ends of the slot receiving the clamping-bolt 26, which bolts 32 limit the extent of the swinging movement that is given by hand to the taper-bar L. The operation of this part will be apparent by reference to the diagram Fig. 12, in which the diverging lines 34 and 35 represent vertical planes passing through the taper-bar in its two positions, and the lines 36 and 37 the path described by the roughing and finishing tools. When the turning operation is commenced, the roughing-tool E is in the position indicated, and the taper-bar L occupies the position indicated by the line 35, and hence the roughing-tool E is properly moved in the direction of the arrow in turning the taper. When the taper of the axle has been roughly turned by the tool E, the feed is stopped automatically, as usual, and the attendant loosens the clamping-bolts 25 and 26 and pushes the taper-bar L over into the position indicated by the line 34, the adjusting-screws 32 stopping against the bolt 26 and limiting the motion. The bolts 25 and 26 are now tightened and the lathe started in the reverse direction. In the act of moving the taper-bar L the finishing-tool F has been moved from the position 38 to the position 39, and the roughing-tool E from the position 40 to the position 41, and as the carriage and tools are moved back in the opposite direction the finishing-tools turn off the taper from the inner end of the axle along toward the outer or smaller end of the taper, thus finishing off the tapering portion of the axle, the tools being beyond the end of the axle and out of the way when another axle is introduced.

The two ends of the axle are simultaneously acted upon, the roughing-tools being set to act preferably from the smaller ends of the axle toward the head-blocks and the finishing-tools in the reverse direction. After the axle has otherwise been finished, as hereinafter described, it is removed from the chucks and tubular spindles and another axle inserted, the taper-bars L are loosened and again set in the positions indicated by the line 35, and the turning operations repeated.

It will be apparent that the extent of taper may be varied by the adjusting-screws 32 to allow more or less lateral motion, and that the respective roughing and finishing tools can be adjusted by moving the slide-rests upon the cross slide G, so as to adapt the tools to different sizes of articles or to different degrees of taper, and the distances between the tools will always be greater than the diameter of the article turned, because each tool is moved toward the article to be turned when the taper-bar is shifted to the proper position to act upon that tool.

Figures 1, 2:
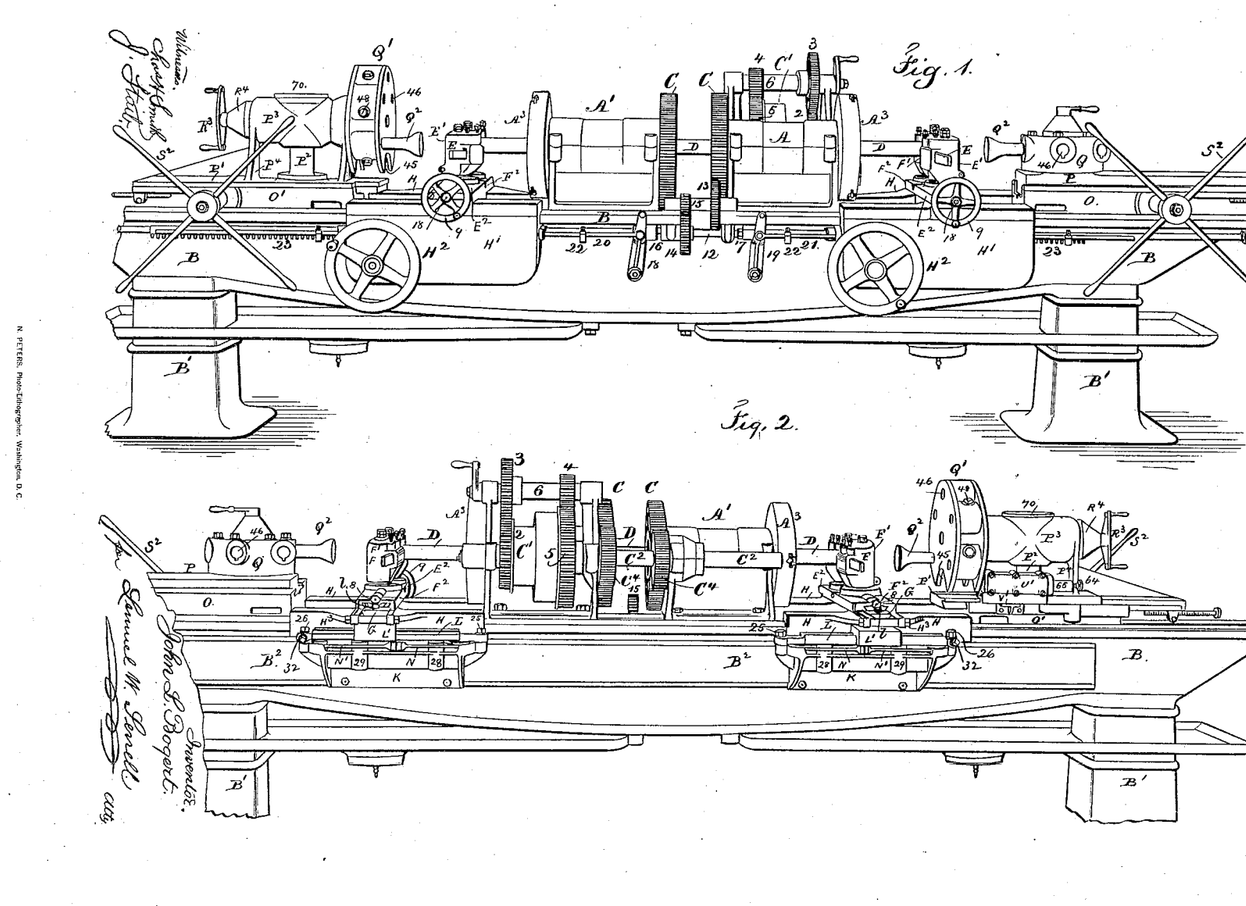
Figure 1 is a perspective view at one side of the machine.
Fig. 2 is a similar view at the other side of the machine.

If it is desired to revolve the lathe always in one direction, the cutting-edge of the finishing-tool F will stand downwardly instead of upwardly, as indicated by dotted lines in Fig. 1.

The end of the carriage H that projects over the taper-bar forms an open jaw, in which the slide G moves back and forth with the vertical pin $l$ and the traveler L', and it is preferable to tie these ends of the carriage H together by the bolt $H^3$, to prevent the parts springing.

Near the ends of the bed B are the turret-stocks O O'. These can be properly placed and clamped by the ordinary anchors and bolts, 42, and upon the turret-stocks are the turret-slides P P'.

Q is a horizontally-revolving turret-head, and Q' is a vertically-revolving turret-head. In the horizontal turret-head the holes for the tools $Q^2$ pass in either radially or parallel to the radius, according as the vertical axis lies in the vertical longitudinal plane through the axle that is being turned or not; but in all instances the horizontal axis of the vertically-revolving turret-head Q' lies outside a vertical plane, passing longitudinally through the axle, so that the axle D may be freely inserted or withdrawn after the turret-head has been revolved, so as to bring the opening 45 in line with such axle D, as indicated in Fig. 7, in which the dotted circle represents the position which the axle occupies when it is being drawn out from the tubular spindles or passed into them.

The devices made use of for rotating the horizontally-revolving turret-head correspond to some of the devices employed in rotating the vertically-revolving turret-head. I will, however, first describe the vertical turret-head represented in larger size in Figs. 4, 5, 6, and 7.

Figure 7:
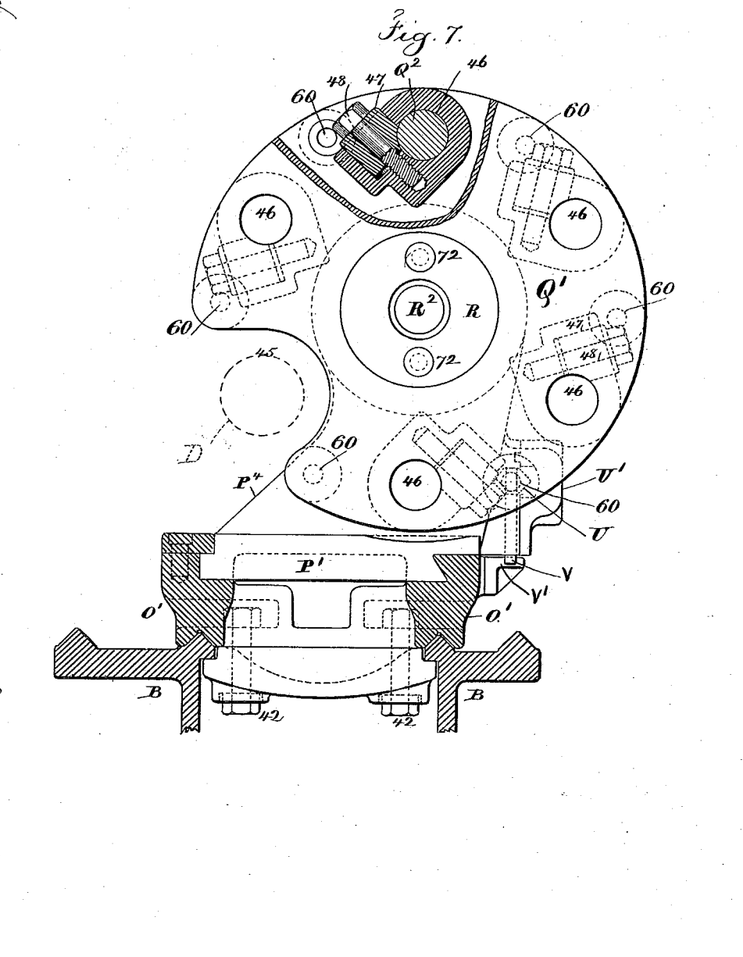
Fig. 7 is an end view, of the turret-head partially in section and a cross-section of the upper part of the bed of the machine.
Figure 8:
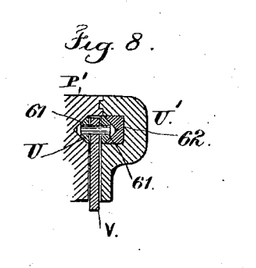
Fig. 8 is a section of the bolt, trigger, and case.
Figures 9, 10:
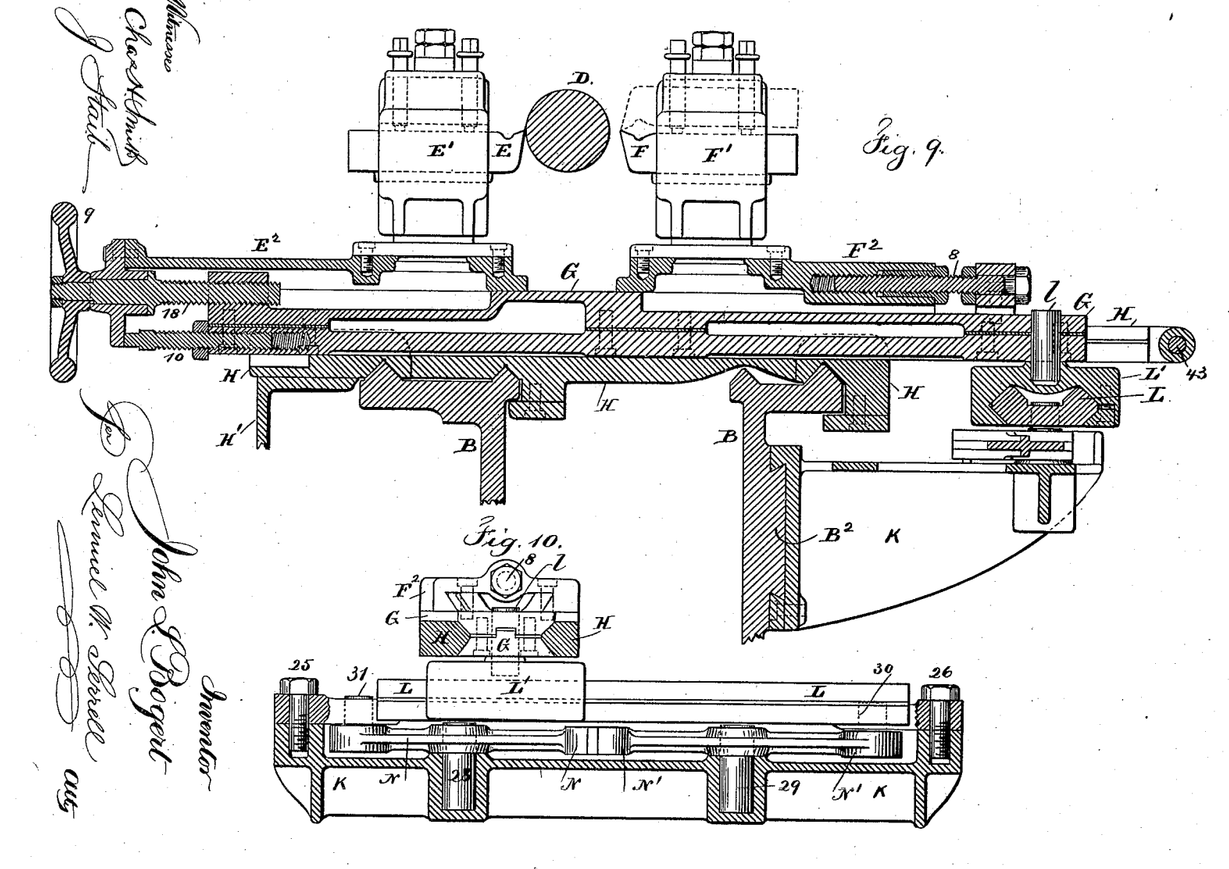
Fig. 9 is a section, in larger size, through the line $x$ X, Fig. 3, with the tool-holders partially in elevation.
Fig. 10 is an end view, partially in section, of the carriage, slide, slide-rest, taper-bar, sectors, and bracket.

The holes 46 for the boring, turning, tapering, or other tools $Q^2$ are parallel with the axis of the vertical turret-head, and there is a clamping-block, 47, and screw 48 in a recess at each tool-holding socket, as indicated in Fig. 7, to clamp and hold the tool in its place. There may be any desired number of tool-holding sockets. I have shown five; and the tools themselves will vary according to the finish that is required at the end of the axle or other article.

Upon the turret slide P' is a vertical cylinder, $P^2$, supporting a horizontal head, $P^3$, the parts P', $P^2$, and $P^4$, and a brace, $P^4$, being preferably cast together. The head $P^3$ supports the spindle R of the turret-head Q', which spindle is received in tapering bearings in the head $P^3$, and the back central portion of the turret-head Q' forms a flat bearing-surface against the end portion of the horizontal head $P^3$, and there is a clamp-bar, $R^2$, with a hand-wheel, $R^3$, screwed on its rear end, by means of which the turret-head Q' is drawn firmly against the forward end of the horizontal head $P^3$ and clamped immovably after the proper tool has been brought around to place for acting upon the end of the axle D, and the turret-slide P' is moved upon the turret-stock O' by means of a pinion, S, rack S³, shaft S', and hand-levers S² to bring the tool up to place and cause it to act properly in turning or finishing the end of the axle. After this has been done, the turret-slide and turret are moved back sufficiently to separate the tool from the axle, and the handle R³ is partially turned to loosen the turret-head, and the slide P' is run back by the pinion S sufficiently to rotate the turret head automatically and bring the next tool around into position for action.

Upon the spindle R is a bevel-pinion, T, gearing to a similar bevel-pinion, T', upon a vertical axis, 50, within the cylinder P², and at the bottom of this axis 50 a ratchet-wheel, 51, is firmly secured. Upon the turret-stock O' is a pawl, 52, having a vertical axis, the swinging end of which is kept toward the ratchet-wheel 51 by a suitable spring, and as the slide P' is run back and the wheel 51 carried bodily against the pawl 52 the pawl rotates the said ratchet-wheel one tooth, and turns the vertical axis 50 and bevel-pinions T' and T, and rotates the spindle and vertical turret-head to bring another tool into position for acting upon the axle. A similar ratchet-wheel and pawl are made use of in rotating the vertical axis of the horizontally-revolving turret-head Q. In this case, however, the pinions T T' are not required, and the axis 50 becomes the axis of the said horizontally-revolving turret-head Q.

It is important to make use of a bolt entering the turret-head to determine the exact position to which the turret-head is turned by each partial rotation, and this bolt is preferably actuated automatically in the manner next described.

The bolt U is made with a slightly-tapering end to enter one of the holes 60 in the back of the vertically-revolving turret-head Q'. These holes and the bolt are so placed that when the bolt enters one of the holes one of the tools Q² will be exactly in line with the axis of the axle D. This bolt U has a body with V-shaped edges 61, and the same is within a longitudinal channel upon the turret-slide P', and there is a cap, U', covering the bolt, and a wedge, 62, between the cap and the body of the bolt, and this wedge has a V-shaped groove at its back surface, receiving the V-shaped edge of the body of the bolt. By setting up this wedge from time to time any wear in the parts is compensated, so that the position of the bolt is not changed by the adjustment. At the rear end of the bolt is a stem, 63, and head 64, and around the stem is a helical spring within the cap 65, which spring tends to project the bolt into the hole in the vertical turret-head, and the bolt can be drawn back by hand whenever necessary by grasping the head 64, and this spring projects the bolt into the hole in the vertically-revolving turret-head when the turret-head has been turned and the hole is brought into line with the bolt. In order to draw back this bolt automatically, I make use of a hanging cam-lever, V, the upper end of which occupies a mortise in the bolt U, and the pivot-pin passes through the bolt and the hanging cam-lever, and there is a mortise in the case, in which this lever V hangs freely; but when the bolt is projected into the hole in the turret-head the convex or cam portion of the lever V is adjacent to the forward end of the mortise, as seen by dotted lines in Fig. 6, and after the turret-head has been moved to clear the tool from the work the lower end of the lever V is near the projection or finger V', that extends out from the turret-stock O'.

The operation of these parts is as follows: After the particular tool in the turret-head has done its work on the axle D or other article, the handle R³ is turned to loosen the parts, the shaft and pinion S are rotated by the hand-levers S², and the turret-slide P' drawn back and the tool separated from its work. The lower end of the hanging cam-lever V now comes in contact with the stationary finger V', and, the movement of the turret-slide being continued, the cam of the lever V being in contact with the metal at the end of the slot, withdraws the bolt as the cam-lever swings, and the lower end rides up upon the top of the finger V', and as the backward movement progresses the bolt U is held back, while the pawl 52 acts upon the ratchet-wheel 51 and rotates the turret-head Q', and as soon as the lower end of the hanging lever V slips off the top of the finger V' the bolt is free to spring into its hole in the turret-head as soon as said head has been turned sufficiently far. The handle R³ is now turned to tighten the parts and the next tool is held firmly, ready to be moved forward and brought into action, as desired. By this construction I am able to give any desired extent of motion to the turret-slide in drawing the same back or in projecting it to bring the tool into operation, and the rotation of the turret-head and the locking of the same are effected automatically and at the time the turret-slide is near its extreme backward movement.

Figure 5:
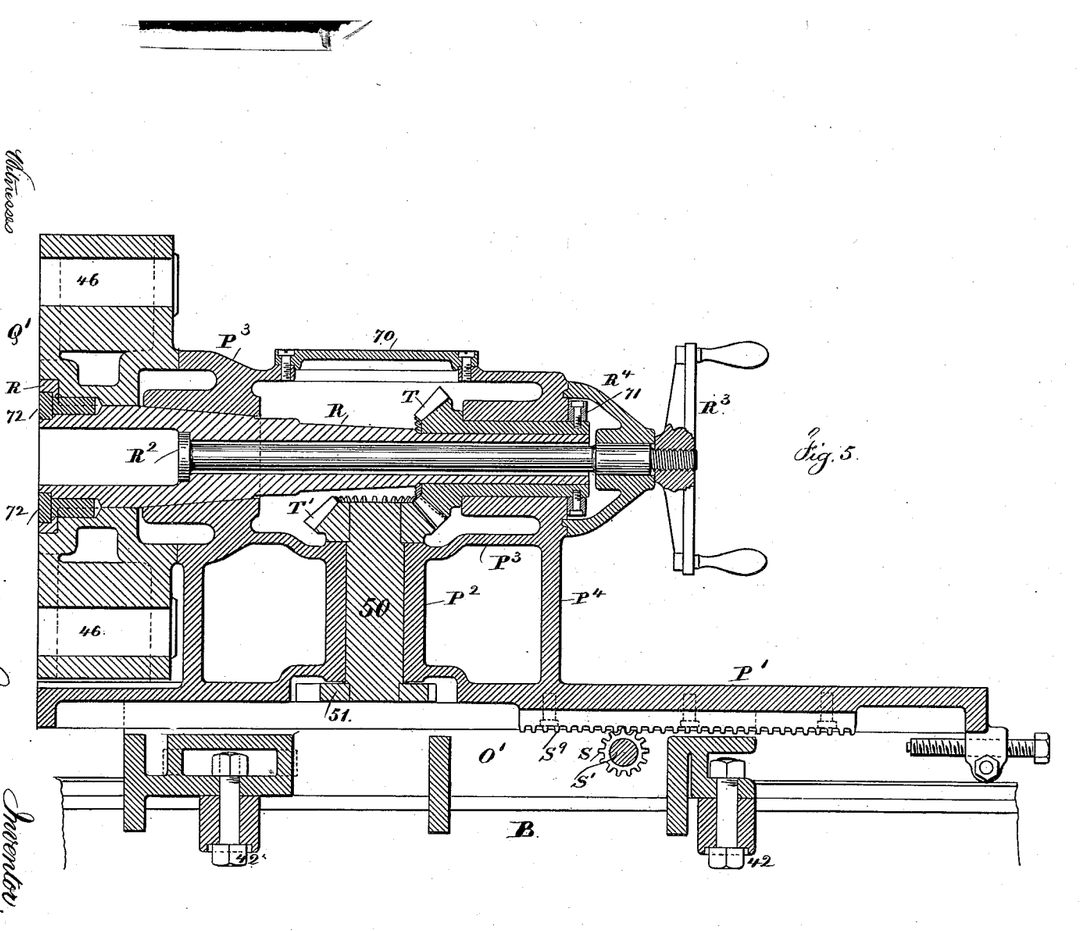
Fig. 5 is a vertical section of the same.
Figure 6:
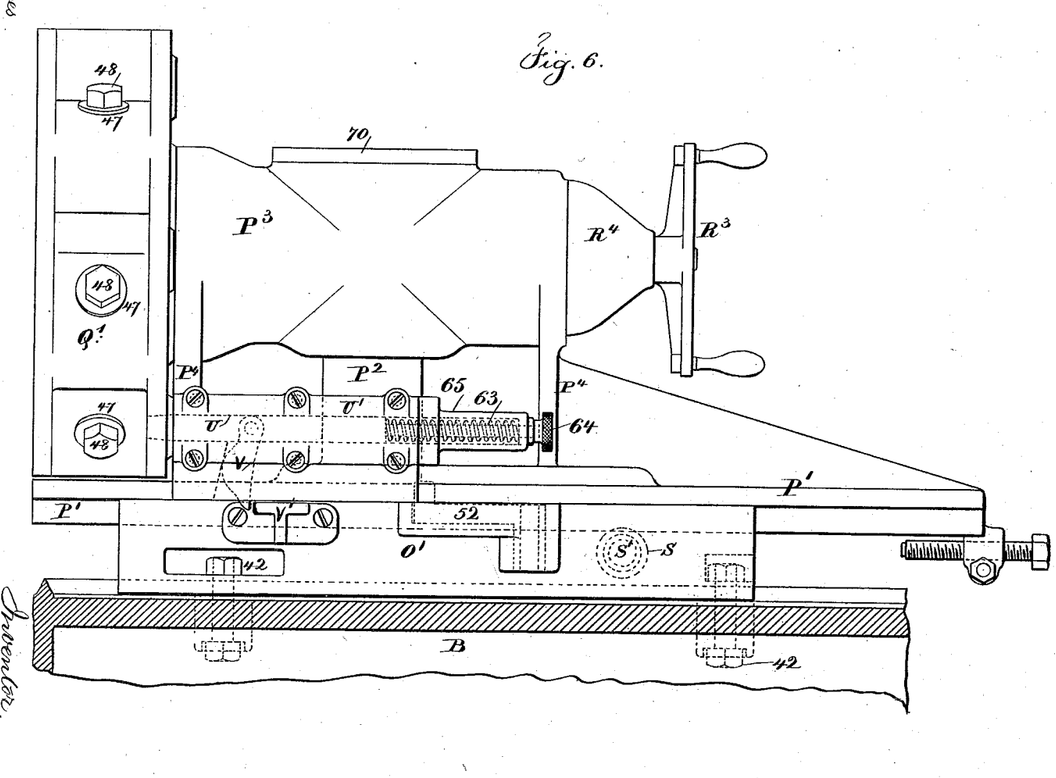

Upon reference to Fig. 5 it will be seen that the movable cap 70, which covers an opening in the horizontal head P³, gives access to the parts within the head in adjusting the gearing or in oiling or cleaning the parts, and that the shell R⁴, setting against the back end of the horizontal head P³, forms a bearing, against which the handle R³ acts in screwing up or tightening the parts, and by removing this shell R⁴ access is given to the collar 71 upon the rear end of the tubular shaft of the bevel-pinion T. In consequence of the spindle being made with a collar at the front end and recessed into the face of the vertical turret-head Q', the parts can all be finished accurately by lathe-work, and the pins or screws 72, introduced through holes in the flange of the spindle R and passing equally into the spindle and the turret-head, prevent the turret-head and spindle changing positions or turning one on the other.

I reserve the right to make separate application for the devices shown but not claimed in this application—such as the turret-head horizontally revolving on a vertical axis that is not in line with the axis of the lathe, and the peculiar construction of the tool-supporting slides and carriages and the stop-motions therewith connected.

I remark that where axles or articles turned are of a common diameter and length one pulley instead of a cone of pulleys, as shown in the drawings, is all that is required; and, furthermore, where but light cuts are required, I dispense with the driving-shaft $C^2$, its bearing, and the gears C and $C^4$, and mount the pulley or cone of pulleys directly on the tubular spindle.

I claim as my invention—

1. The combination, with the bed, of the head-stocks A A', one of which is adjustable lengthwise of the bed, the tubular spindles in the respective head-stocks through which the article to be turned is passed, and the clamping-chuck at the outer end of each spindle, the back shaft, cone-pulleys, and gearings, substantially as specified, whereby the axle or other article to be turned is grasped by the chucks adjacent to the place where the work is to be done and the parts can be adjusted and revolved, substantially as specified.

2. The combination, with the head-stocks A A' and the bed B, of the tubular spindles $A^2$ and chucks $A^3$, through which the article to be turned is passed, the driving-shaft $C^2$ and cone-pulleys mounted upon one of the head-stocks, and the gears $C^4$ upon the shaft $C^2$ and the driving-gears C upon the respective tubular spindles, substantially as set forth.

3. The combination, in a lathe for turning axles or other articles, of two head-stocks, one of which is adjustable, the bed upon which said head-stocks are supported, the tubular spindles and chucks for holding the work, the gearing for revolving the spindle, cross-slides, carriages, tools and tool-holding posts for turning the end portions of the axle and turret-heads for holding the tools employed in finishing the end portions of the axle, and the beds and slides and mechanism for supporting and moving the respective turret-heads, substantially as specified.

4. The combination, in a lathe for turning axles and other articles, of a cross-slide, two tool posts or holders supported by the same, a carriage upon which the slide rests, means for moving the carriage longitudinally of the lathe, a taper-bar and a traveler upon the same connected to the cross-slide, and means for adjusting the taper-bar, substantially as set forth, whereby either tool can be brought into action in turning the taper, substantially as set forth.

5. The combination, with a tool-holder and a cross-slide for the same, of a carriage upon which the cross-slide rests, an adjustable stop-screw and the screw for adjusting the tool-holder upon the cross-slide, means for moving the carriage longitudinally of the lathe, a taper-bar and a traveler upon the same, a bracket for sustaining the taper-bar, and mechanism, substantially as specified, for adjusting and holding the taper-bar, substantially as specified.

6. The combination, with the slide and the tool-holder, of a taper-bar, a traveler upon the taper-bar connected to the slide, two sector-levers gearing together, pivotal connections from the same to the taper-bar, one of which connections is nearer to the pivot of the sector than the other connections, and a bed or bracket for supporting the parts whereby the taper-bar can be moved laterally to vary the position of the same in relation to the axis of the lathe, and clamping-bolts for holding the taper-bar, substantially as set forth.

7. The combination, with the taper-bar, the sector-levers, and the bracket or bed for supporting the same, of the clamping-bolts 25 and 26, and the adjusting-screws 32, for determining the lateral movement of the taper-bar, substantially as set forth.

8. The combination, in a lathe for turning axles or similar articles, of two head-stocks, their tubular spindles and chucks, two cross-slides and the tools, holders upon the same, and the taper-bars, and mechanism for supporting such taper-bars and allowing them to be moved laterally in shifting one set of tools out of action and the other tools into action in turning the taper, substantially as set forth.

9. The combination, with the head-stocks and tubular spindles and chucks for holding and revolving an axle or similar article, of turret-heads for holding the tools made use of in finishing the ends of the axle, slides for supporting the turret-heads, and mechanism, substantially as specified, for revolving the turret-heads progressively and bringing the successive tools into action, substantially as set forth.

10. The combination of a vertically-revolving turret-head having holes for the reception of the tools and an opening to allow for the insertion or removal of the axle or other article being operated upon with a horizontal spindle, turret-slide, and mechanism, substantially as specified, for revolving the turret-head progressively and for holding the same in position, substantially as set forth.

11. The hanging lever V, pivoted at its upper end to the bolt U for locking the turret-head, said lever V having a cam-shaped projection that comes in contact with the turret-stock at the end of the mortise within which said cam-lever V hangs, so that the bolt is withdrawn by the joint action of the cam and the finger V', and said lever V swings by gravity, so as not to require a spring, substantially as specified.

12. The combination, in a lathe for turning axles or other articles, of two head-stocks, one of which is adjustable, a bed upon which said head-stocks are supported, tubular spindles and chucks for holding the work, gearing for revolving the spindles, slides, and holders for the tools for turning the end portions of the axles, substantially as specified.

13. The combination, in a lathe for turning axles or other articles, of two head-stocks, one of which is adjustable, a bed upon which said head-stocks are supported, tubular spindles and chucks for holding the work, gearing for revolving the spindles, carriages traveling along said bed, and tool-holders for the tools for turning the end portions of the axle, substantially as specified.

14. The combination, with the revolving chucking device, of the vertically-revolving turret-head having holes for the reception of the tools and an opening to allow for the insertion or removal of the article to be operated upon, a horizontal spindle, turret-stock, mechanism for sliding the same, and mechanism, substantially as specified, for securing the vertically-revolving turret-head in the proper position, substantially as set forth.

15. The combination, in a lathe for turning taper articles, of a tool-holder, means for moving the tool-holder and tool, and a taper-bar slotted at the ends, and clamping and adjusting screws, and a traveler upon the taper-bar to give the lateral motion to the tool as the tool and holder are moved longitudinally of the lathe, substantially as set forth.

16. The combination, in a lathe, of mechanism for revolving the article to be operated upon, and a vertically-revolving turret-head for containing the successively-operating tools and having an opening to allow for the insertion or withdrawal of the article operated upon, substantially as specified.

17. The combination, with the tool holder, of a cross-slide for the same and a carriage upon which the cross-slide rests, said carriage having open jaws at the back end, and the bolt $H^3$, to tie the ends of the carriage together, substantially as set forth.

Signed by me this 21st day of March, A. D. 1887.

JOHN L. BOGERT.

Witnesses:
  GEO. T. PINCKNEY,
  W. L. SERRELL.